(12) United States Patent
Mori

(10) Patent No.: US 7,333,162 B2
(45) Date of Patent: Feb. 19, 2008

(54) DISPLAY UNIT STRUCTURE

(75) Inventor: Eiichi Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 10/772,251

(22) Filed: Feb. 6, 2004

(65) Prior Publication Data

US 2004/0174470 A1 Sep. 9, 2004

(30) Foreign Application Priority Data

Mar. 7, 2003 (JP) ............................. 2003-062326

(51) Int. Cl.
*G02F 1/1333* (2006.01)
(52) U.S. Cl. .......................................... 349/58; 349/60
(58) Field of Classification Search .................. 349/58, 349/60
See application file for complete search history.

(56) References Cited

U.S. PATENT DOCUMENTS 6,507,377 B1 * 1/2003 Jung ........................... 349/60
6,721,174 B2 * 4/2004 Bang ........................... 361/681
6,741,299 B2 * 5/2004 Fukayama et al. ............ 349/58
6,762,806 B1 * 7/2004 Matsuo et al. ................ 349/58

FOREIGN PATENT DOCUMENTS

JP 2000-19978 1/2000
JP 2001-337621 12/2001

\* cited by examiner

*Primary Examiner*—David Nelms
*Assistant Examiner*—Phu Vu
(74) *Attorney, Agent, or Firm*—Westerman, Hattori, Daniels & Adrian, LLP.

(57) ABSTRACT

A display device of an information-processing device comprises a display unit and a cover enclosing a back-side surface of the display unit. The display unit comprises a plate, a chassis, and a bezel holding peripheral edges of the plate. In the display device, the bezel is provided with an extension portion which is extended from a side of the display unit and outwardly projects from an end of the chassis.

12 Claims, 7 Drawing Sheets

DISPLAY UNIT STRUCTURE

CROSS-REFERENCE TO RELATED APPLICATIONS

This application is based upon and claims the benefit of priority from the prior Japanese patent application No. 2003-062326, filed on Mar. 7, 2003, the entire contents of which are incorporated herein by reference.

BACKGROUND OF THE INVENTION

1. Field of the Invention

The present invention relates to a display unit structure which is used for a display device of a portable information-processing device, such as a notebook personal computer.

2. Description of the Related Art

In recent years, the slim structure and the space saving are demanded for display units which are used as display devices of personal computers. With such demand, there is the tendency that the LCD (liquid crystal display) monitors which are excellent in the slim structure and the space saving are often used for the computer displays, rather than the CRT (cathode ray tube) monitors.

By the utilization of the display units having the slim structure, such as the LCD monitors, a portable information-processing device which is excellent in the slim structure and the space saving, such as a notebook personal computer, is accepted in the market.

Japanese Laid-Open Patent Application No. 2000-019978 discloses a display device of a portable information-processing device in which a front cosmetic plate made of a metallic material is used in order to increase the mechanical strength of the front cosmetic plate in the display device.

Moreover, Japanese Laid-Open Patent Application No. 2001-337621 discloses a flat liquid-crystal display unit in which a video-signal processing circuit board for a LCD monitor is fixed directly to the interior of the display unit, which makes it unnecessary to provide a dedicated supporting part for the circuit board.

FIG. 1 is a perspective exploded view of a conventional display unit structure. FIG. 2 is a cross-sectional view of the conventional display unit structure taken along the line II-II' indicated in FIG. 1.

The display device of FIG. 1 is an example of a LCD display device of a notebook personal computer. As shown in FIG. 1, the LCD display device 20 generally is constructed by assembling of a front cosmetic plate 1, a display unit 2, an electronic part 3 associated with the display unit, mechanical parts 4 for mounting the display unit movably to the computer housing, and a cover 5.

As shown in FIG. 2, the LCD display device 20 in which the above components 1-5 are assembled together has a height that is equivalent to the total height of the front cosmetic plate 1, the display unit 2, and the cover 5.

However, the slim structure is demanded for display devices of portable information-processing devices. In order to satisfy such a demand, there is the tendency that the height of the display unit is made smaller through the years.

There are several methods for realizing the slim structure of the display device of the portable information-processing device. A typical one of such methods is to make the height of the LCD display unit smaller. For example, the typical method is directed to taking the two measures: making small the height of a glass plate used in the LCD display unit; and making small the height of a light-guide plate of a back light source in the LCD display unit.

FIG. 3 is a cross-sectional view of the conventional display unit structure of FIG. 1.

As shown in FIG. 3, the LCD display device includes a bezel 6, a glass plate 7, a multiple-layered optical sheet 8, a light-guide plate 9, a chassis 10, a printed circuit board 11, and a CCFL (cold cathode fluorescent lamp) 12.

In the LCD display device of FIG. 3, the bezel 6 generally is a component part for holding the peripheral edges of the glass plate 7. The bezel 6 is produced by molding, and the molding of the bezel 6 is bent downward at its end portions. The bezel 6 is arranged in a box-like formation so that the end surfaces of the chassis 10 are enclosed with the downward bent portions of the bezel 6. The light-guide plate 9, the optical sheet 8, and the glass plate 7 are arranged inside the chassis 10 by stacking them on the chassis 10 one by one.

The CCFL lamp 12 is disposed at the position within the base portion (the left-hand side of FIG. 3) of the chassis 10, where the lamp 12 confronts the incidence-side edge of the light-guide plate 9. The printed circuit board 11 is mounted beneath the back-side surface of the light-guide plate 9 in the vicinity of the edge portion (the right-hand side of FIG. 3) of the chassis 10.

The two measures taken by the above-mentioned mounting method are inadequate for realizing the slim structure of a display device of a portable information-processing device to some extent, and the unresolved problems still remain with the two measures. Namely, as for the measure of making small the height of the glass plate used in the LCD display device, it is difficult to ensure the mechanical strength of the glass plate at a desired level when the glass plate becomes thin. As for the measure of making small the height of the light-guide plate, it is difficult to ensure the brightness of the back-light lamp at a desired level when the light-guide plate becomes thin.

SUMMARY OF THE INVENTION

An object of the present invention is to provide a novel and useful display unit structure in which the above-described problems are eliminated.

Another object of the present invention is to provide a display unit structure, such as an LCD display unit, which realizes a slim structure of a display device of a portable information-processing device by utilizing a new mounting method.

The above-mentioned objects of the present invention are achieved by a display device comprising: a display unit having a plate, a chassis and a bezel holding peripheral edges of the plate, the bezel being provided with an extension portion which is extended from a side of the display unit and outwardly projects from an end of the chassis; and a cover enclosing a back-side surface of the display unit.

The above-mentioned objects of the present invention are achieved by an electronic apparatus comprising: a display unit having a plate, a chassis and a bezel holding peripheral edges of the plate, the bezel being provided with an extension portion which is extended from a side of the display unit and outwardly projects from an end of the chassis; and a cover enclosing a back-side surface of the display unit.

The above-mentioned objects of the present invention are achieved by a display unit comprising: a plate; a chassis; and a bezel holding peripheral edges of the plate, the bezel being provided with an extension portion which is extended from a side of the display unit and outwardly projects from an end of the chassis.

In the display device of the present invention, the configuration of the bezel in the display unit is modified from the conventional box-like formation of the bezel which is downwardly bent at its end portions, so that it is extended from a side of the display unit without bending it. An inside space, surrounded by the end surfaces of the display unit and the cover, is formed beneath the back-side surface of the bezel extension portion. Hence, it is possible to dispose the electronic part within the inside space at the end of the chassis, and it is no longer necessary to use a front cosmetic plate in order to conceal the electronic part.

According to the display device of the present invention, the front cosmetic plate needed for the conventional structure is no longer necessary, and the display device of the present invention makes it possible to realize the slim structure by eliminating the height of the front cosmetic plate. Moreover, the demand for the slim structure of the display device of the portable information-processing device can be satisfied according to the present invention.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 4:
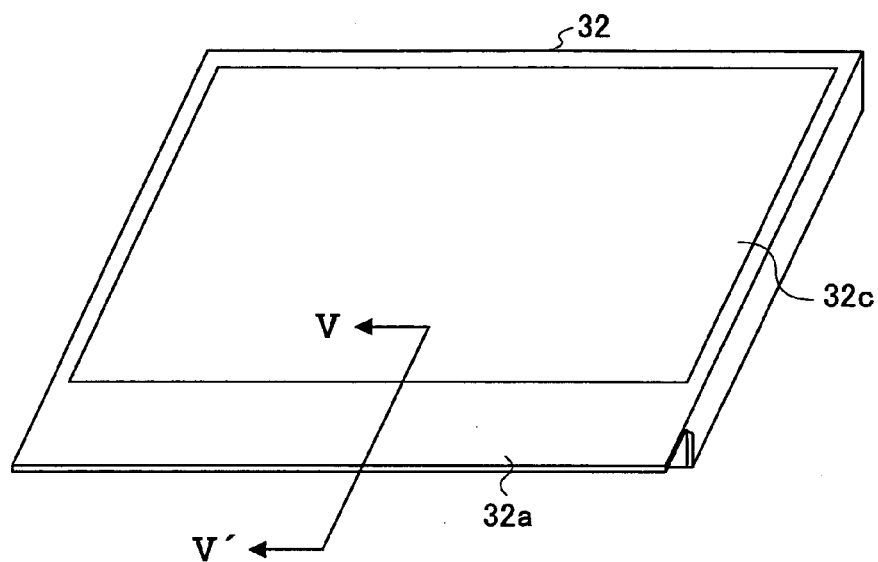
FIG. 4 is a perspective view of a display unit of a preferred embodiment of the display device of the invention.
Figure 5:
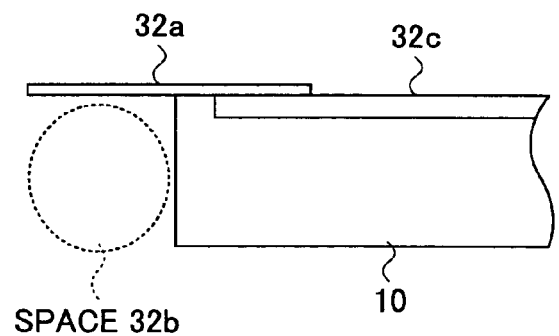
FIG. 5 is a cross-sectional view of the display unit taken along the line V-V' indicated in FIG. 4.

FIG. 4 is a perspective view of a display unit of one preferred embodiment of the display device of the invention. FIG. 5 is a cross-sectional view of the display unit taken along the line V-V' indicated in FIG. 4.

As shown in FIG. 4 and FIG. 5, the LCD display unit 32 of the present embodiment includes a bezel which holds the peripheral edges of a glass plate 32c. The bezel is provided with an extension portion 32a which is extended from the longitudinal side of the display unit 32 near the base portion of the display unit 32 and outwardly projects from the end of a chassis 10. An inside space 32b, which is surrounded by the end surfaces of the display unit 32 and the cover 5, is formed beneath the back-side surface of the bezel extension portion 32a.

Figure 1:
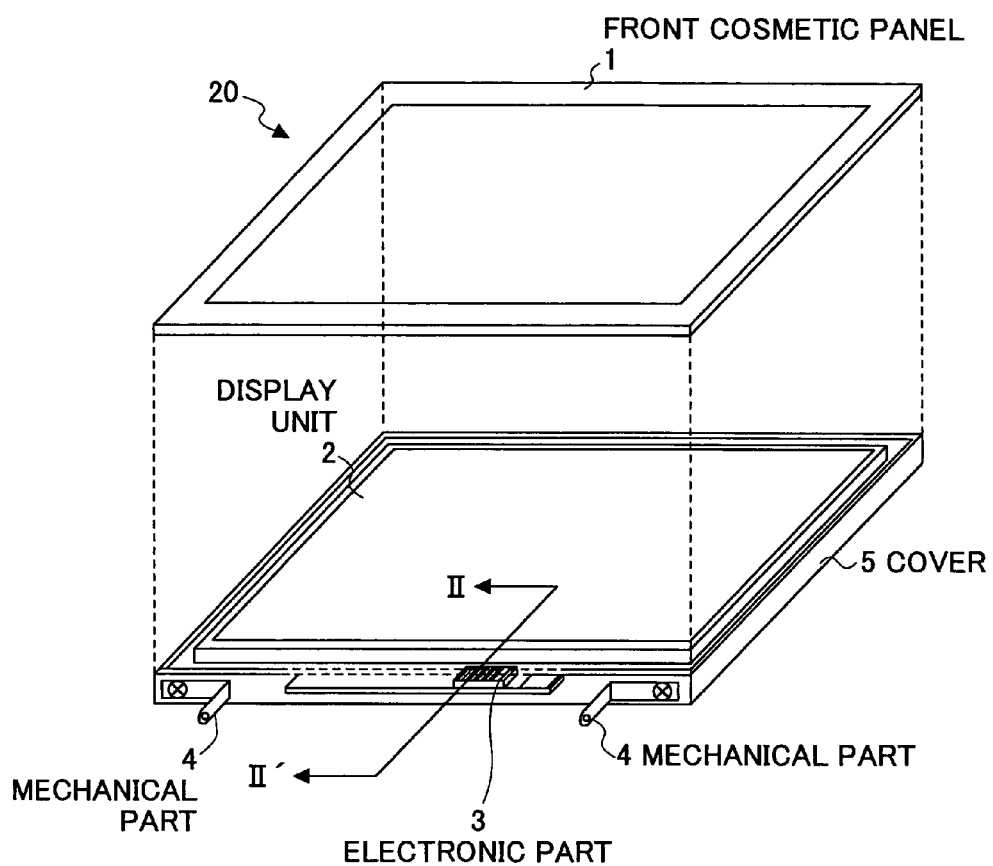
FIG. 1 is a perspective exploded view of a conventional display unit structure.

In the conventional display unit structure of FIG. 1, the bezel 6 is provided by the molding and the molding of the bezel 6 are bent downwardly at its end portions. The bezel 6 is arranged in a box-like formation so that the end surfaces of the chassis 10 are covered by the downward bent portions of the bezel 6.

In contrast, in the display unit 32 of FIG. 4, the bezel is provided with the extension portion 32a, and this extension portion 32a is extended from the longitudinal side of the display unit 32 near the base portion of the display unit 32 and outwardly projects from the end of the chassis 10. The inside space 32b is surrounded by the end surfaces of the display unit 32 and the cover 5, and the inside space 32b is formed beneath the back-side surface of the extension portion 32a.

By the use of the bezel extension portion 32a, the electronic part 3 can be disposed within the inside space 32b at the end of the chassis 10 additionally. It is no longer necessary to conceal the electronic part 3 with the front cosmetic plate 1 as in the conventional display unit structure. Consequently, the display unit structure of the present embodiment makes it possible to realize the slim structure of the display device by eliminating the height or thickness of the front cosmetic plate 1.

Figure 6:
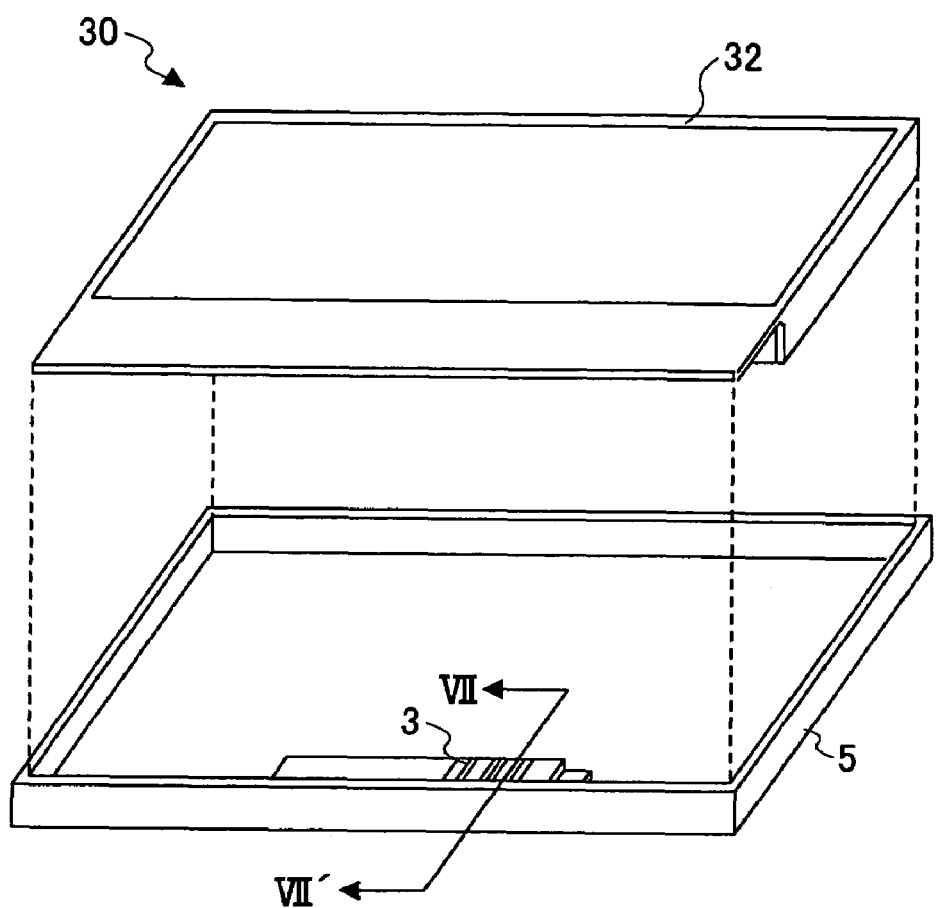
FIG. 6 is a perspective exploded view of a display unit structure of the present embodiment in which the display unit of FIG. 4 is incorporated.
Figure 7:
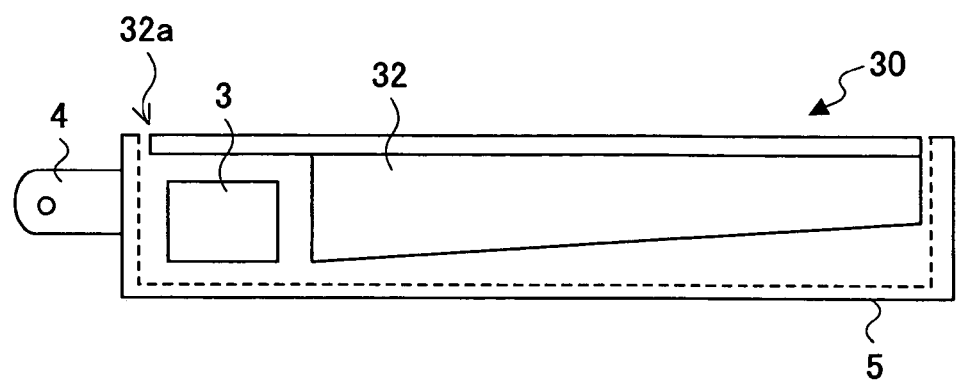
FIG. 7 is a cross-sectional view of the display unit structure taken along the line VII-VII' indicated in FIG. 6.

FIG. 6 is a perspective exploded view of the display unit structure of the present embodiment in which the display unit of FIG. 4 is incorporated. FIG. 7 is a cross-sectional view of the display unit structure taken along the line VII-VII' indicated in FIG. 6.

As shown in FIG. 6 and FIG. 7, the LCD display device 30 of the present embodiment generally is constructed by assembling of a rectangular display unit 32, an electronic part 3 associated with the display unit, a cover 5 enclosing the back-side surface of the display unit, and mechanical parts 4 for mounting the display unit movably to the computer housing.

The display unit 32 according to the present invention is not limited to the rectangular form as in the present embodiment. For example, the display unit 32 according to the present invention may be a LCD display unit which has a uniform thickness and is provided in the form of a rectangular parallelepiped. Alternatively, the display unit 32 according to the present invention may be provided in an arbitrary form as long as it is in conformity with the principles of the present invention.

As shown in FIG. 7, the LCD display device 30 in the state where the above-mentioned components are assembled has a height that is equivalent to the total height of the display unit 32 and the cover 5 only.

In the present embodiment, the bezel of the display unit 32 is provided with the extension portion 32a which is extended from the longitudinal side of the display unit 32 near the base portion of the display unit 32 and outwardly projects from the end of the chassis 10. There is no front cosmetic plate 1 provided on the display unit as in the conventional display unit structure.

The inside space 32b is surrounded by the end surfaces of the display unit 32 and the cover 5, and formed beneath the back-side surface of the bezel extension portion 32a. The electronic part 3 can be disposed in the inside space 32b.

Therefore, in the display unit structure of the present embodiment, it is no longer necessary to use the front cosmetic plate 1, and it is possible to realize the slim structure of the display device.

Figure 10:
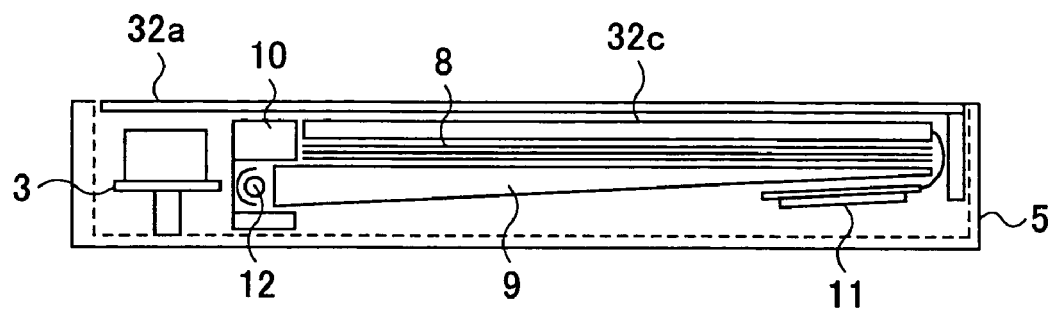
FIG. 10 is a cross-sectional view of the display unit structure of FIG. 6.

FIG. 10 is a cross-sectional view of the display unit structure of FIG. 6.

In the display unit 32 of FIG. 10, the bezel of the display unit 32 serves to hold the peripheral edges of the glass plate 32c. Moreover, the bezel of the display unit 32 includes the extension portion 32a which is provided to extend from the longitudinal side of the display unit 32 near the base portion (the left-hand side of FIG. 10) of the display unit 32 and outwardly project from the end of the chassis 10.

The light-guide plate 9, the optical sheet 8, and the glass plate 32c are stacked inside the chassis 10 one by one in this order. The CCFL lamp 12 is disposed at the position within the base portion (the left-hand side of FIG. 10) of the chassis 10, where the lamp 12 confronts the incidence-side edge of the light-guide plate 9. The printed circuit board 11 is mounted on the back-side surface of the light-guide plate 9 in the vicinity of the edge portion (the right-hand side of FIG. 10) of the chassis 10.

In the display unit 32 of FIG. 10, the electronic part 3 can be arranged within the inside space 32b which is surrounded by the end surfaces of the display unit 32 and the cover 5 and is located beneath the back-side surface of the bezel extension portion 32a, and it is no longer necessary to conceal the electronic part 3 with the front cosmetic plate 1 as in the conventional display unit structure.

Figure 2:
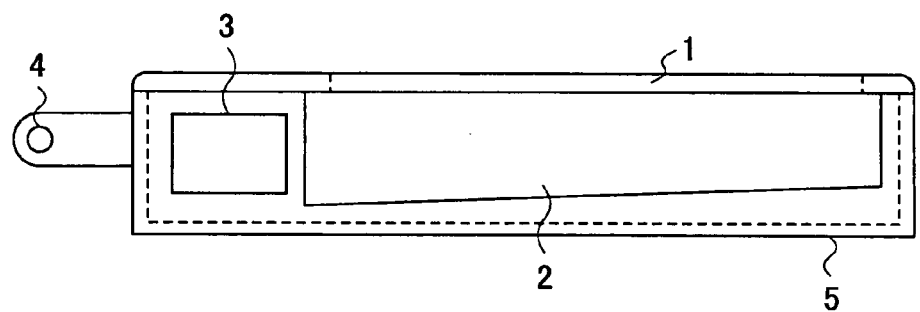
FIG. 2 is a cross-sectional view of the conventional display unit structure taken along the line II-II' indicated in FIG. 1.
Figure 3:
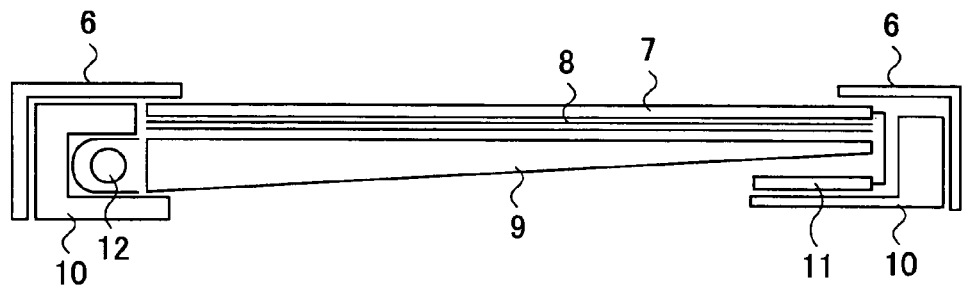
FIG. 3 is a cross-sectional view of the conventional display unit structure of FIG. 1.

When the display unit structure of FIG. 7 according to the invention is compared with the conventional structure of FIG. 2, it can be easily understood that there is no front cosmetic plate 1 provided on the display unit as in the conventional structure of FIG. 2, and the slim structure of the display device can be realized with the display unit structure of FIG. 7.

According to the display unit structure of the present invention, any method of assembling a display device of an information-processing device, such as a notebook personal computer, can be utilized. More specifically, either a method of fastening screws to the cover from the front-side surface of the bezel or a method of fastening screws to the side surface of the display unit can be utilized.

Figure 9:
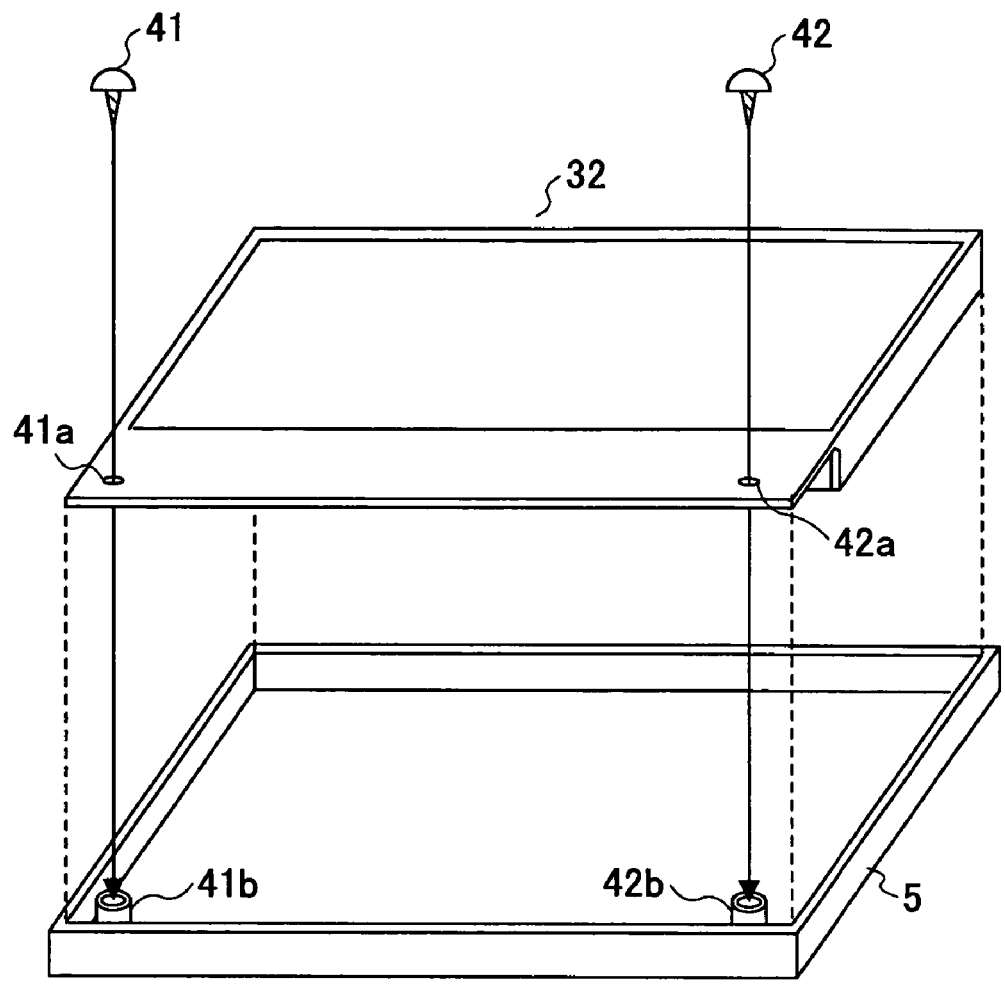
FIG. 9 is a diagram of the display unit structure of FIG. 6 for explaining the assembly method.

FIG. 9 is a diagram of the display unit structure of FIG. 6 for explaining the assembly method.

In the example of the assembly method of FIG. 9, the display unit 32 is fixed to the cover 5 by fastening screws 41 and 42 to the cover 5. Holes 41a and 42a are formed in the left-side and right-side corners of the bezel extension portion 32a, which is extended from the longitudinal side of the display unit 32 near the base portion of the display unit 32. Bosses 41b and 42b are formed at the positions of the bottom of the cover 5 corresponding to the holes 41a and 42a of the bezel extension portion 32a, respectively.

From the front-side surface of the display unit 32, the display unit 32 is fixed to the cover 5 by fastening the screws 41 and 42 to the bosses 41b and 42b of the cover 5 through the holes 41a and 42a of the bezel extension portion 32a, respectively.

Figure 8:
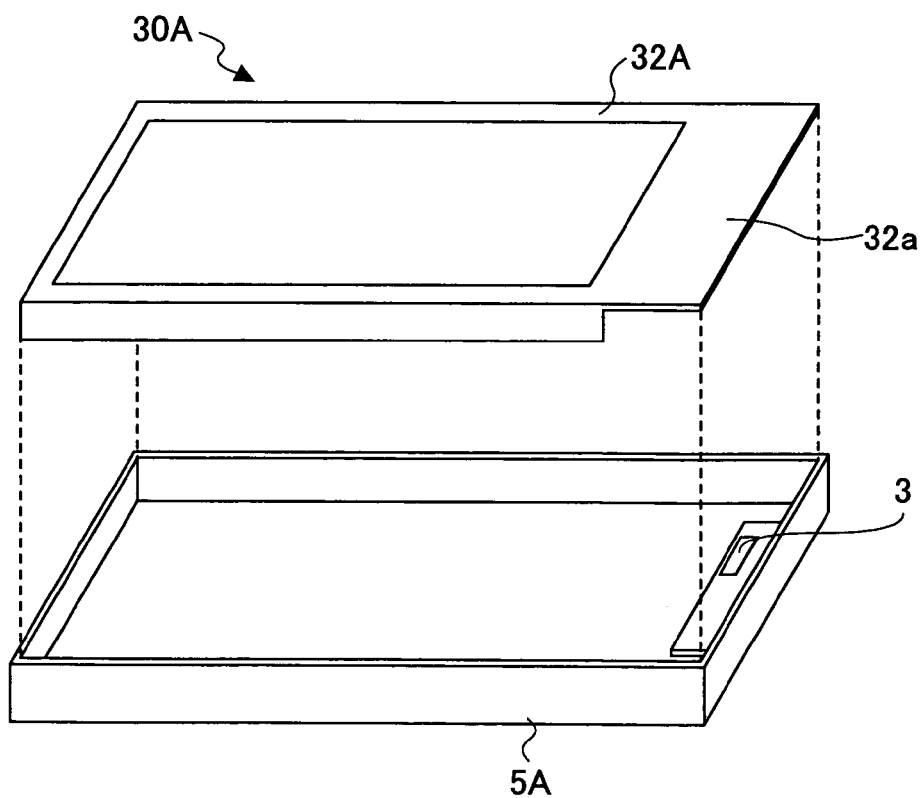
FIG. 8 is a perspective exploded view of a display unit structure of another preferred embodiment of the display device of the invention.

FIG. 8 is a perspective exploded view of a display unit structure of another preferred embodiment of the display device of the invention.

The display device 30A shown in FIG. 8 includes a rectangular display unit 32A and a cover 5A enclosing the back-side surface of the display unit 32A.

As shown in FIG. 8, in the display device 30A of this embodiment, the bezel of the display unit 32A is provided with an extension portion 32a which is extended from the right-hand end lateral side of the display unit 32A. There is no front cosmetic plate 1 provided on the display unit as in the conventional display unit structure of FIG. 1. An inside space is surrounded by the end surfaces of the display unit 32A and the cover 5A, and this inside space is formed beneath the back-side surface of the bezel extension portion 32a.

Therefore, similar to the embodiment of FIG. 6, it is no longer necessary for the display unit structure of the present embodiment to conceal the electronic part by using the front cosmetic plate 1 as in the conventional structure, and the slim structure of the display device can be realized.

Moreover, in the display unit structure of the present embodiment, the electronic part 3 can be arranged within the inside space which is located beneath the back-side surface of the bezel extension portion 32a.

The assembly method for the display device 30A of the present embodiment may be the same as the assembly method described above with reference to FIG. 9. Namely, the display unit 32A may be fixed to the cover 5A by fastening the screws respectively to the bosses of the cover 5A through the holes of the bezel extension portion 32a at the upper-side and lower-side corners of the extension portion 32a, which is extended from the lateral side of the display unit 32A.

Figure 11:
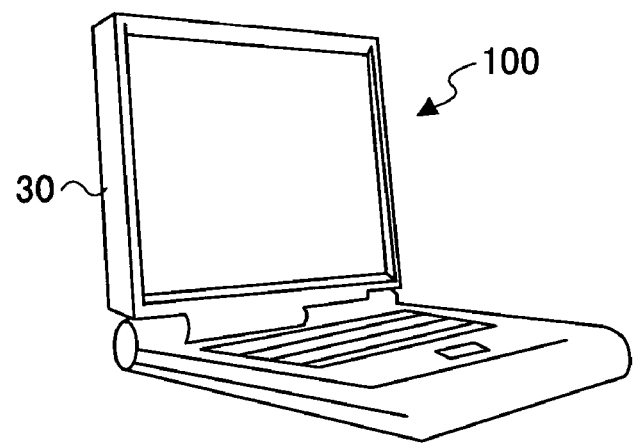
FIG. 11 is a perspective view of a notebook personal computer in which the display unit structure of the invention is incorporated.

FIG. 11 is a perspective view of a notebook personal computer in which the display unit structure of the invention is incorporated.

The notebook personal computer 100 of FIG. 11 is provided with the display device 30 which is rotatably mounted to the computer housing by using the mechanical parts 4.

As described previously, the bezel of the display unit 32 is provided with the extension portion 32a which is extended from the longitudinal side of the display unit 32 near the base portion of the display unit 32. There is no front cosmetic plate 1 provided on the display unit as in the conventional display unit structure of FIG. 1.

Therefore, the slim structure of the display unit 32 can be realized, and the demand for the slim structure for the display device of the notebook personal computer 100 can be satisfied by the use of the display unit structure of the present invention.

As described in the foregoing, according to the display device of the present invention, the front cosmetic plate needed for the conventional structure is no longer necessary, and the display device of the present invention makes it possible to realize the slim structure by eliminating the height of the front cosmetic plate. Moreover, the demand for the slim structure of the display device of the portable information-processing device can be satisfied according to the present invention.

The present invention is not limited to the above-described embodiments, and variations and modifications may be made without departing from the scope of the present invention.

What is claimed is:

1. A display device comprising:
    a display unit having a plate;
    a chassis surrounding peripheral edges of the plate and supporting the peripheral edges of the plate;
    a bezel formed on the chassis and holding the peripheral edges of the plate; and
    a cover enclosing a back-side surface of the display unit, the bezel including a portion that is bent downward at its end portion to cover the chassis and an extension portion that extends from a side of the display unit without bending downward at its end portion, the extension portion projecting outwardly beyond an end of the chassis at a height that is no higher than an upper surface of the cover, wherein the display device has a height that is equivalent to a total height of the display unit and the cover only.

2. A display device according to claim 1 wherein the bezel extension portion is disposed in a vicinity of a base portion of the display unit.

3. A display device according to claim 1 wherein the display unit is arranged in a rectangular formation, and the bezel extension portion is extended from a lateral side of the display unit.

4. A display device according to claim 1 wherein an inside space is surrounded by end surfaces of the display unit and the cover, and formed beneath a back-side surface of the bezel extension portion, and an electronic part is disposed within the inside space.

5. An electronic apparatus comprising:
a display unit having a plate;
a chassis surrounding peripheral edges of the plate and supporting the peripheral edges of the plate;
a bezel formed on the chassis and holding peripheral edges of the plate; and
a cover enclosing a back-side surface of the display unit,
the bezel including a portion that is bent downward at its end portion to cover the chassis and an extension portion that extends from a side of the display unit without bending downward at its end portion, the extension portion projecting outwardly beyond an end of the chassis at a height that is no higher than an upper surface of the cover,
wherein the electronic apparatus has a height that is equivalent to a total height of the display unit and the cover only.

6. An electronic apparatus according to claim 5 wherein the bezel extension portion is disposed in a vicinity of a base portion of the display unit.

7. An electronic apparatus according to claim 5 wherein the display unit is arranged in a rectangular formation, and the bezel extension portion is extended from a lateral side of the display unit.

8. An electronic apparatus according to claim 5 wherein an inside space is surrounded by end surfaces of the display unit and the cover, and formed beneath a back-side surface of the bezel extension portion, and an electronic part is disposed within the inside space.

9. A display device, comprising:
a display unit, including
a plate;
a chassis surrounding peripheral edges of the plate and supporting the peripheral edges of the plate;
a cover enclosing a back-side surface of the display unit; and
a bezel formed on the chassis and holding the peripheral edges of the plate, the bezel including a portion that is bent downward at its end portion to cover the chassis and an extension portion which is extended from a side of the display unit without bending downward at its end portion, the extension portion projecting outwardly beyond an end of the chassis at a height that is no higher than an upper surface of the cover,
wherein the display device has a height that is equivalent to a total height of the display unit and cover only.

10. A display unit according to claim 9 wherein the bezel extension portion is disposed in a vicinity of a base portion of the display unit.

11. A display unit according to claim 9 wherein the display unit is arranged in a rectangular formation, and the bezel extension portion is extended from a lateral side of the display unit.

12. A display unit according to claim 11 wherein an inside space is surrounded by end surfaces of the display unit and a cover, and formed beneath a back-side surface of the bezel extension portion, and an electronic part is disposed within the inside space.

* * * * *